(12) United States Patent
Yamada

(10) Patent No.: US 7,362,732 B2
(45) Date of Patent: Apr. 22, 2008

(54) TRACKING CONTROL IN A CDMA SYSTEM

(75) Inventor: Junya Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 1248 days.

(21) Appl. No.: 10/224,280

(22) Filed: Aug. 21, 2002

(65) Prior Publication Data

US 2003/0039221 A1    Feb. 27, 2003

(30) Foreign Application Priority Data

Aug. 22, 2001    (JP)    ............................. 2001-250955

(51) Int. Cl.
*H04B 7/216*    (2006.01)
(52) U.S. Cl. ..................................... 370/335; 375/326
(58) Field of Classification Search ................ 370/335, 370/342; 375/326, 142
See application file for complete search history.

(56) References Cited

U.S. PATENT DOCUMENTS

| | | | | |
|---|---|---|---|---|
| 5,897,665 A * | 4/1999 | Padwekar | .................... | 711/212 |
| 6,081,547 A * | 6/2000 | Miya | .......................... | 375/130 |
| 6,188,679 B1 | 2/2001 | Sato | | |
| 6,249,251 B1 * | 6/2001 | Chang et al. | ................ | 342/378 |
| 6,320,899 B1 * | 11/2001 | Chang et al. | ............... | 375/147 |
| 6,333,934 B1 * | 12/2001 | Miura | ........................ | 370/335 |
| 6,421,373 B1 * | 7/2002 | Saito | .......................... | 375/148 |
| 6,473,452 B2 * | 10/2002 | Whight et al. | ............... | 375/142 |

FOREIGN PATENT DOCUMENTS

| | | |
|---|---|---|
| JP | 08-116293 | 5/1996 |
| JP | 08-340276 | 12/1996 |
| JP | 09-503374 | 3/1997 |
| JP | 10-173630 | 6/1998 |
| JP | 11-88291 | 3/1999 |
| JP | 11-196026 | 7/1999 |
| JP | 11-274978 | 10/1999 |
| JP | 11-298401 | 10/1999 |
| JP | 2000-22665 | 1/2000 |
| JP | 2001-211101 | 8/2001 |

OTHER PUBLICATIONS

Japanese Office Action dated Mar. 15, 2005, with partial English translation.

* cited by examiner

*Primary Examiner*—Andrew C. Lee
(74) *Attorney, Agent, or Firm*—McGinn IP Law Group, PLLC

(57) ABSTRACT

A tracking circuit includes a plurality of phase sections each corresponding to different phases of a despreading code. Each of the phase sections includes a correlator for producing a correlation value between a reception signal and a corresponding phase of the spreading code and a power calculator calculates a power value from the correlation value. A comparator compares power values received from the phase sections to produce a comparison result. A controller selectively activates the plurality of phase sections based on the comparison result, allowing power consumption to be reduced.

17 Claims, 9 Drawing Sheets

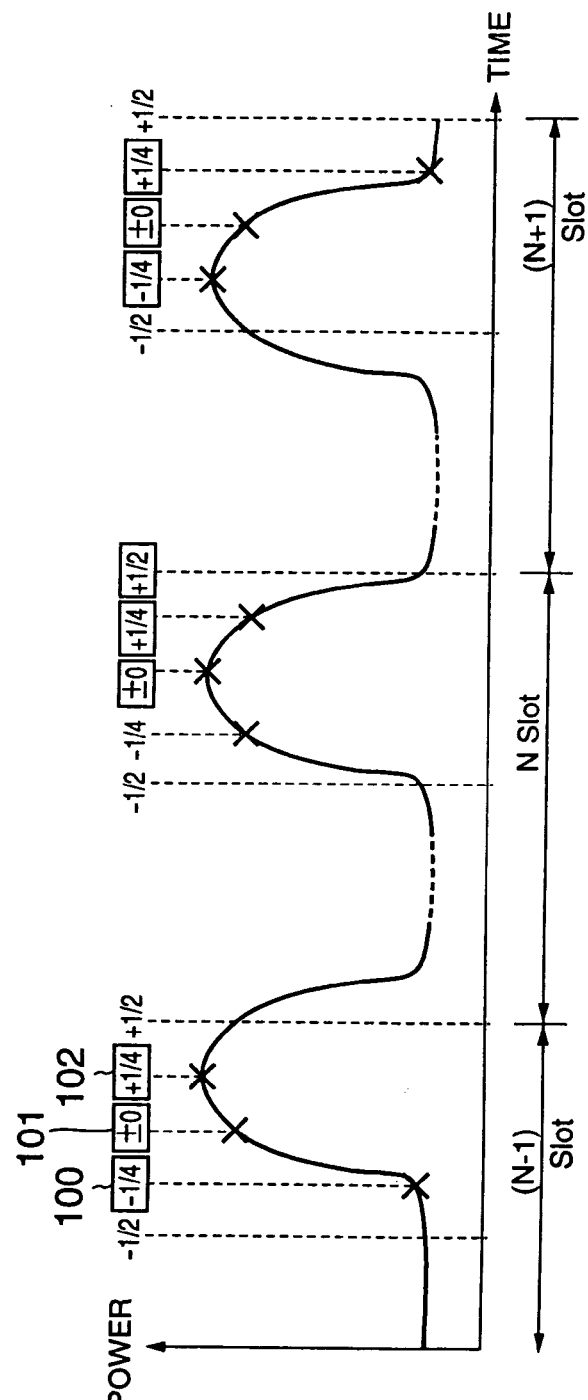
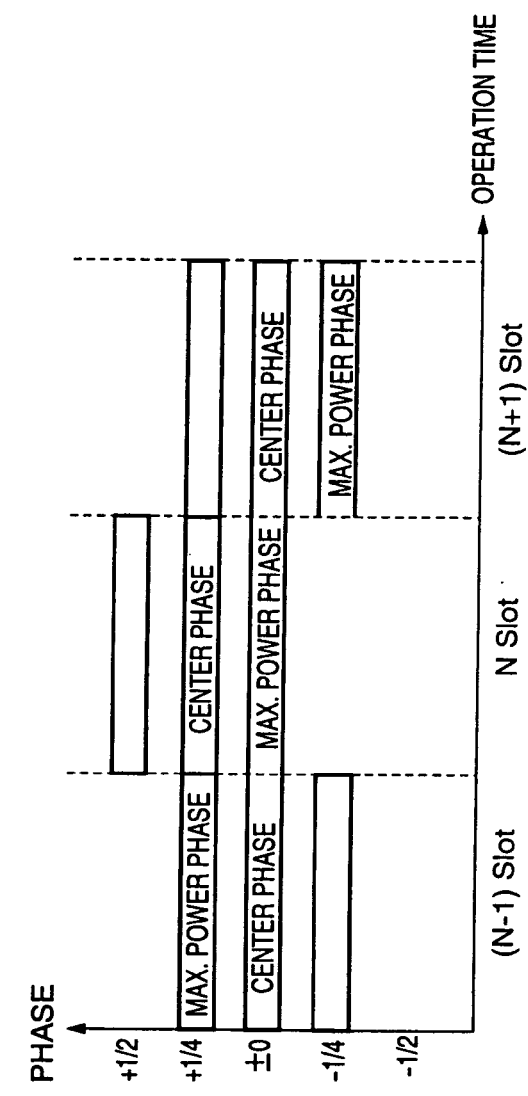
FIG. 3A
FIG. 3B

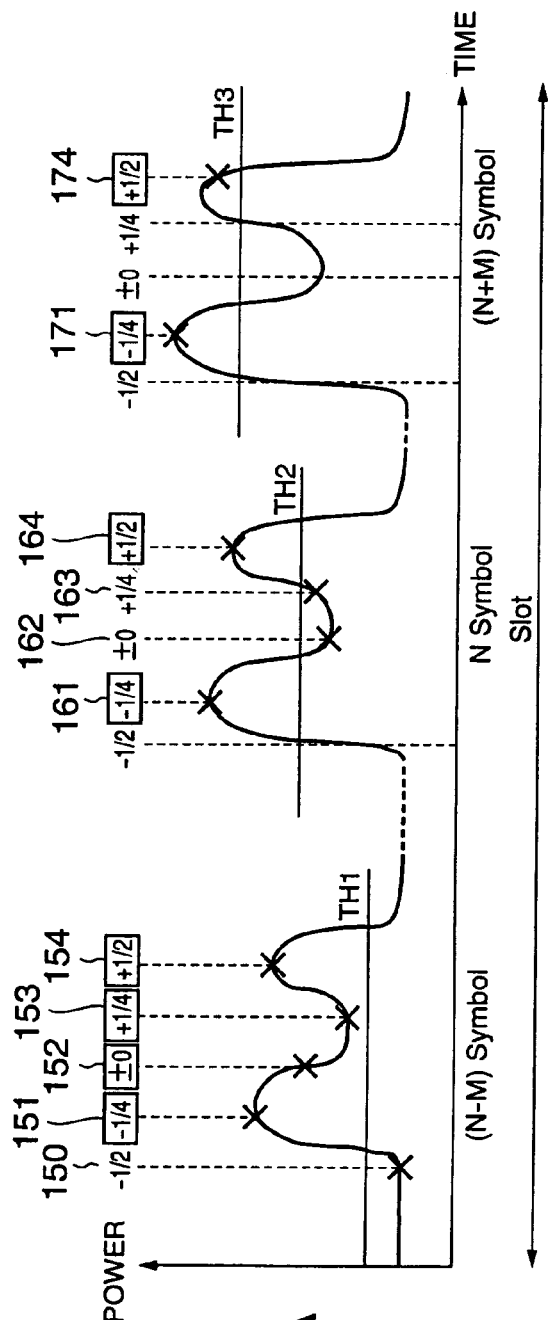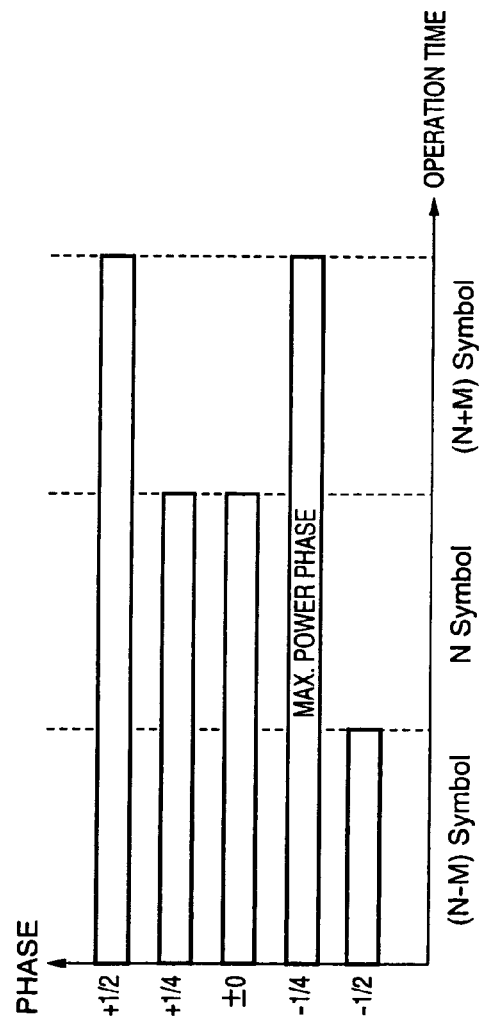
FIG. 5A
FIG. 5B

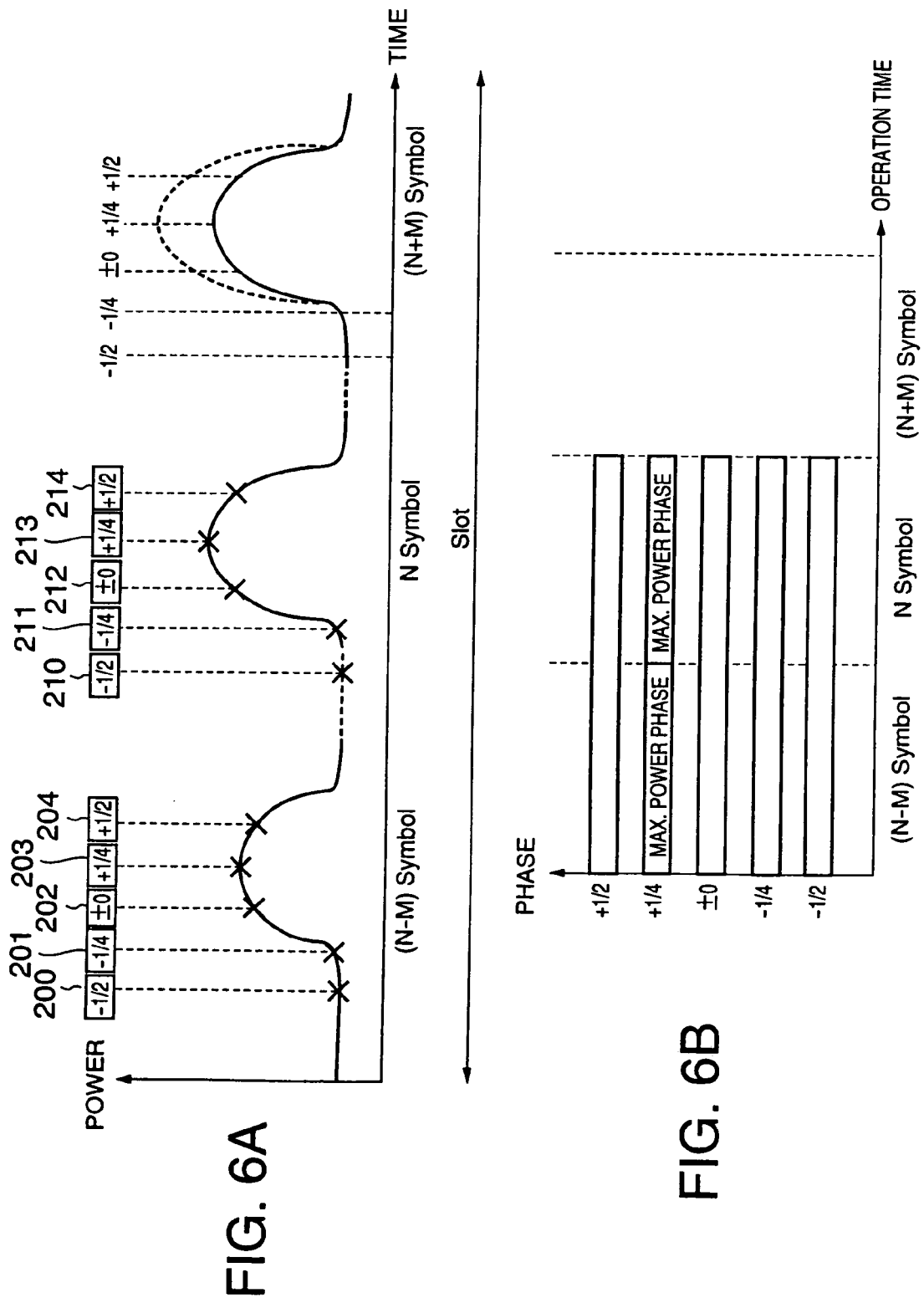

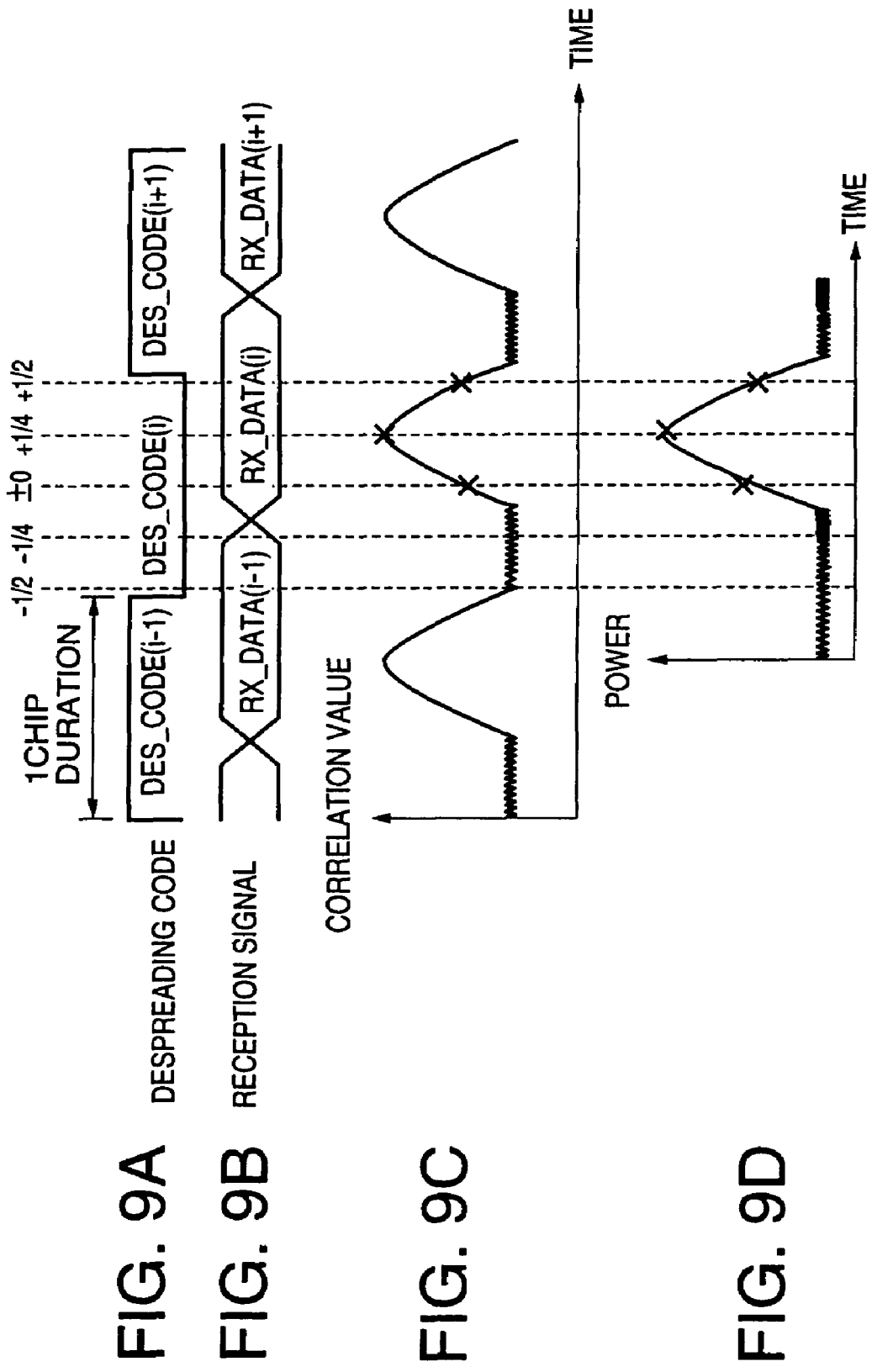

TRACKING CONTROL IN A CDMA SYSTEM

BACKGROUND OF THE INVENTION

1. Field of the Invention

The present invention relates to tracking techniques of tracking acquired synchronization in a CDMA (Code Division Multiple Access) system.

2. Description of the Related Art

In CDMA mobile communication systems, it is necessary to always synchronize the despreading code sequence at a receiving side with the spreading code sequence at a transmitting side so that a reception signal is precisely demodulated at a CDMA receiver. Since a reception signal after acquisition is not always synchronized with the despreading code timing, tracking control is needed after the code acquisition has been completed.

As a conventional tracking control method, a CDMA chip synchronization circuit has been disclosed in U.S. Pat. No. 6,188,679 B1. This CDMA chip synchronization circuit is provided with multiple correlators to output correlation values each obtained for phased despreading codes. When a reception signal after acquisition is over-sampled at a multiple of the chip rate fc to produce reception data, as shown in FIGS. 9A-9D five correlators are provided to cope with delays of the timing which correspond to $\pm\frac{1}{2}$ chip and $+\frac{1}{4}$ chip from the center position ($\pm 0$). Then, a correlation value having a best receiving quality is selected from the five correlation values, which are provided with certain intervals of time. In the case as shown in FIGS. 9C and 9D, the selected correlation value is obtained by a correlator corresponding to $+\frac{1}{4}$-chip phase In the above conventional tracking technique, however it is necessary to obtain the correlation values or powers at all phases. This causes the amount of circuit hardware to become larger as the over-oversampling factor increases- In addition, such calculations of correlation values or powers are performed in units of high-speed chip duration. Accordingly, power consumption required for tracking control is considerably increased as the over-sampling factor increases.

SUMMARY OF THE INVENTION

An object of the present invention is to provide a tracking method and circuit allowing power consumption to be reduced without sacrificing performance of high-speed and high-accuracy tracking Another object of the present invention is to provide a tracking method and circuit allowing the amount of circuit hardware to be reduced.

According to the present invention, a tracking circuit in a CDMA receiver, includes a plurality or phase sections each corresponding to different phases or a despreading code, wherein each of the phase sections produces correlation-related data based on a reception signal and a corresponding phase of the despreading codes; and a controller for selectively activating the plurality of phase sections to perform a tracking operation based on correlation-related data received from the plurality of phase sections.

According to an aspect of the present invention, a tracking control circuit for a CDMA receiver includes: a calculator for calculating correlation-related data based on a reception signal and each of a plurality of phased spreading codes, a plurality of memories each corresponding to different phases of the phased spreading codes, plurality of phases and are selectively activated, thereby achieving reduced amount of hardware and power consumption. At the same time since the correlator and the power calculator are activated to calculate correlation values and power values only during necessary phase periods, the speed of a tracking operation is improved and the power consumption is reduced. Accordingly, power consumption can be reduced without sacrificing performance of high-speed and high-accuracy tracking.

BRIEF DESCRIPTION OF THE DRAWINGS

FIG. 3A is a diagram showing a wave form of power for explanation of a tracking control according to a first embodiment of the present invention;

FIG. 3B is a time chart showing an operation of the tracking control according to the first embodiment:

FIG. 5A is a diagram showing a wave form of power for explanation of a tracking control according to a third embodiment of the present invention:

FIG. 5B is a time chart showing an operation of the tracking control according to the third embodiment;

FIG. 6A is a diagram showing a wave form of power for explanation of a tracking control according to a fourth embodiment of the present invention;

FIG. 6B is a time chart showing an operation of the tracking control according to the fourth embodiment:

FIG. 9A is a diagram showing an example of a despreading code sequence;

FIG. 9B is a time chart showing a reception signal after acquisition;

FIG. 9C is a diagram showing a change of a correlating value over time; and

FIG. 9D is a diagram showing a change of power over time.

DESCRIPTION OF THE PREFERRED EMBODIMENTS

Figure 1:
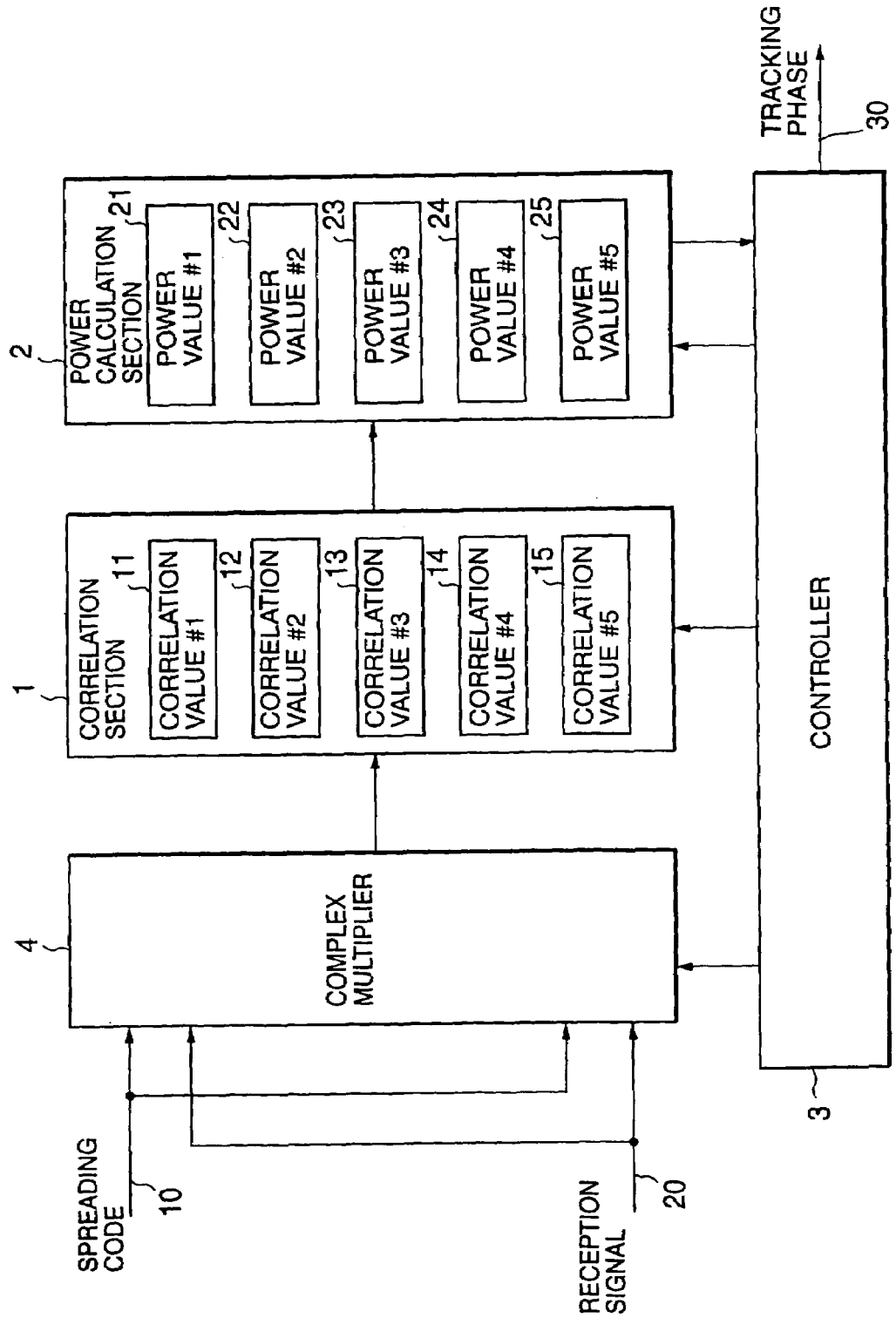
FIG. 1 is a schematic block diagram showing a tracking control circuit according to the present invention.

Referring to FIG. 1, a tracking control circuit according to the present invention includes a correlation section 1, a power calculation section 2, a controller, and a complex multiplier 4. In this circuit, the correlation section 1 includes correlation value registers 115 each corresponding to a predetermined number of different chip phases (here, each denoted by #1-#5). The power calculation section 2 includes power value registers 21-25 each corresponding to the different chip phases #1-#5. Under control of the controller 3, the complex multiplier, 4 complex-multiplies each of different chip phases of a spreading code 10 and a reception signal 20 after acquisition to produce correlation values each corresponding to the different chip phases #1-#5. The power values stored in respective ones of the power value registers 21-25 are monitored to select a tracking phase 30 and control the circuit operation status of each different chip phase in several ways as described later. A detailed circuit structure of the tracking control circuit will he described with reference to FIG. 2.

Figure 2:
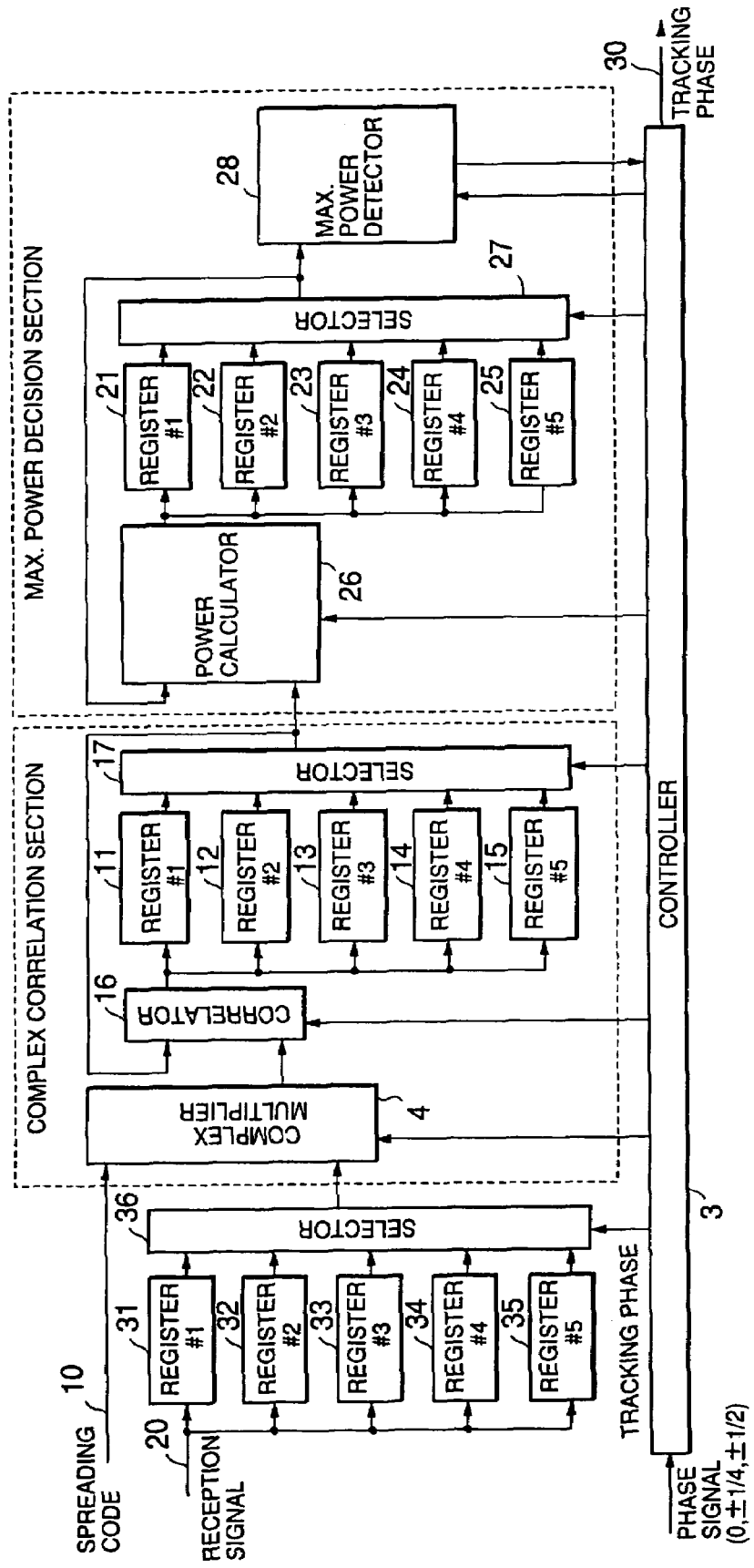
FIG. 2 is a block diagram showing a preferred embodiment of the tracking control circuit of FIG. 1.

As shown in FIG. 2, after the reception signal 20 has been over-sampled at a multiple of the chip rate fc, sampled signals are stored onto respective ones of registers 31-35 each corresponding to the different chip phase. #1-#5. Here, the center timing #3 of the five timings #1-#5 is represented by ±0 and the other timings #1, #2 #4 and #5 are represented by −½−¼, +¼ and +½, by −½, −¼, +¼ and +½ chips from the center timing (±0)

The registers 31-35 are connected to a selector 36, which selects one of the registers 31-35 to connect it to the complex multiplier 4 depending on a tracking phase obtained by the controller 3, which will he described later. The complex multiplier 4 multiplies the selected reception signal by the spreading code 10 under the control of the controller 3. A correlator 16 uses the output of the complex multiplier 4 to produce a correlation value and stores it to a corresponding one of the correlation value registers 11-15. The correlation value registers 11-15 are connected to a selector 17, which selects one of the correlation value registers 11-15 to connect it to a power calculator 26 under the control of the controller 3. The output of the selector 17 can be fed lack to the correlator 16 to calculate a sum of the correlation values stored in selected correlation value registers during a predetermined time period.

The power calculator 26 calculates a power value from a correlation value received from the selector 17 and the power value is stored onto a corresponding one of tie power value registers 21-25. The power value registers 21-25 are connected to a selector 27, which selects one of the power value registers 21-25 to connect it to a maximum power detector 28 under the control of the controller 3. The maximum power detector 28 compares selected power values inputted from the selector 27 to output its maximum power value or comparison result to the controller 3. The output of the selector 27 can be fed back to the power calculator 26 to calculate a sum of the power values stored in selected power value registers during a predetermined time period.

The controller 3 controls the selectors 36, 17 and 27 and the complex multiplier 4, the correlator 16, the power calculator 26 and the maximum power detector 28 and outputs a tracking phase based on a phase signal and the maximum power value. The phase signal indicates a phase of the spreading code 10, which is one of −½, −¼, +¼ and +½. The tracking phase is a phase providing the maximum power value. The controller 3 may provide a tracking control operation by running a control program thereon. Preferred control operations will be described later.

For example, it is assumed that the controller 3 determines that three phases 10−¼, 0 and +¼ are selected for tracking operation based on the phase signal and the maximum power aloe, which will be described later. When the phase signal indicates a deviation of −¼ chip, the controller 3 activates the complex multiplier 4 and the correlator 16 and stores the correlation value onto the correlation value register 12 corresponding to the phase −¼. When the phase signal sequentially indicates 0 and +¼, the controller 3 sequentially activates the complex multiplier 4 and the correlator 16 and stores correlation values for the phases 0 and +¼ onto the correlation value registers 13 and 14. Similarly, the selector 17 sequentially selects the correlation values stored in the correlation value registers 12, 13 and 14 and the power calculator 26 calculates power values to store the power value resistors 22, 23 and 24, respectively. The selector 27 sequentially selects the power values stored in the power value registers 22, 23 and 24 and the maximum power detector 28 detects the maximum one from the selected power values.

In this manner, selected phases are activated by the controller. The complex multiplier 4, the correlator 16 and the power calculator 26 are shared between the phases −½, −¼, 0, +¼ and +½ and are selectively activated, reduced amount of hardware and power consumption At the same time, since only selected phases are activated, a smaller number of calculation operations is needed, resulting in increased speed of a tracking control operation.

First Embodiment

A tracking operation according to a first embodiment of the present invention is performed by the controller 3 selectively activating the phases #1-#5 depending on which phase provides a maximum power value. When the tracking phase is a phase p(i) (p(i)=−½, −¼, 0, +¼, or +½), the controller 3 selects and a p(0) and its adjacent phases p(−1) and p(+1) and stops operating the other phases. More specifically, in FIG. 2, the controller 3 instructs the selectors 17 and 27 to select registers corresponding to the phases p(−1), p(0) and p(+1). And the controller 3 activates the complex multiplier 4, the correlator 16 and the power calculator 26 only during time periods each corresponding to the selected phases p(−1), p(0) and p(+1).

As shown in FIGS. 3A and 3B, assuming that the tracking phase is the phase ±0 in a (N−2) slot, the controller 3 activates three phases −¼, 0 and −¼ in (N to perform the tracking operation. More specifically, the controller 3 activates the complex multiplier 4, the correlator 16 and the power calculator 26 only during time periods each corresponding to the selected phases −¼0 and +¼. Further, the controller 3 stops the complex multiplier 4, the correlator 16 and the power calculator 26 operating during the other phases −½ and +½. Accordingly, three power values 100, 101 and 102 are sequentially calculated by the power calculator 26 and stored onto the corresponding registers 22-24. As shown in FIG. 3B, the maximum power detector 28 compares the power values 100, 101 and 102 and notifies the controller 3 of the maximum power value 102. The controller 3 determines the phase +¼ corresponding to the maximum power value 102 as the tracking phase for the next N slot.

In N slot, since the tracking phase is the phase +¼, the controller 3 activates three phases 0, +¼ and +½ in N slot to perform the tracking operation. More specifically, the controller 3 activates the complex multiplier 4, the correlator 16 and the power calculator 26 only during time periods each corresponding to the selected phases 0, +¼ and +½. Further, the controller 3 stops the complex multiplier 4, the correlator 16 and the power calculator 26 operating during the other phases −¼ and ½. Accordingly, three power values are sequentially calculated by the power calculator 26 and stored onto the corresponding registers 23-25.

As shown in FIG. 3B, the maximum power detector 28 compares the power values and notifies the controller 3 of the maximum power value. The controller 3 determines the phase 0 corresponding to the maximum power value as the tracking phase for the next (N+1) slot.

In this manner, the tracking control is performed by repeating the above control in each slot.

Second Embodiment

In a tracking operation according to a second embodiment of the present invention, a tracking phase is determined by the controller 3 selectively activating the phases #1-#5 during a desired time period shorter than the slot.

Figures 4A, 4B:
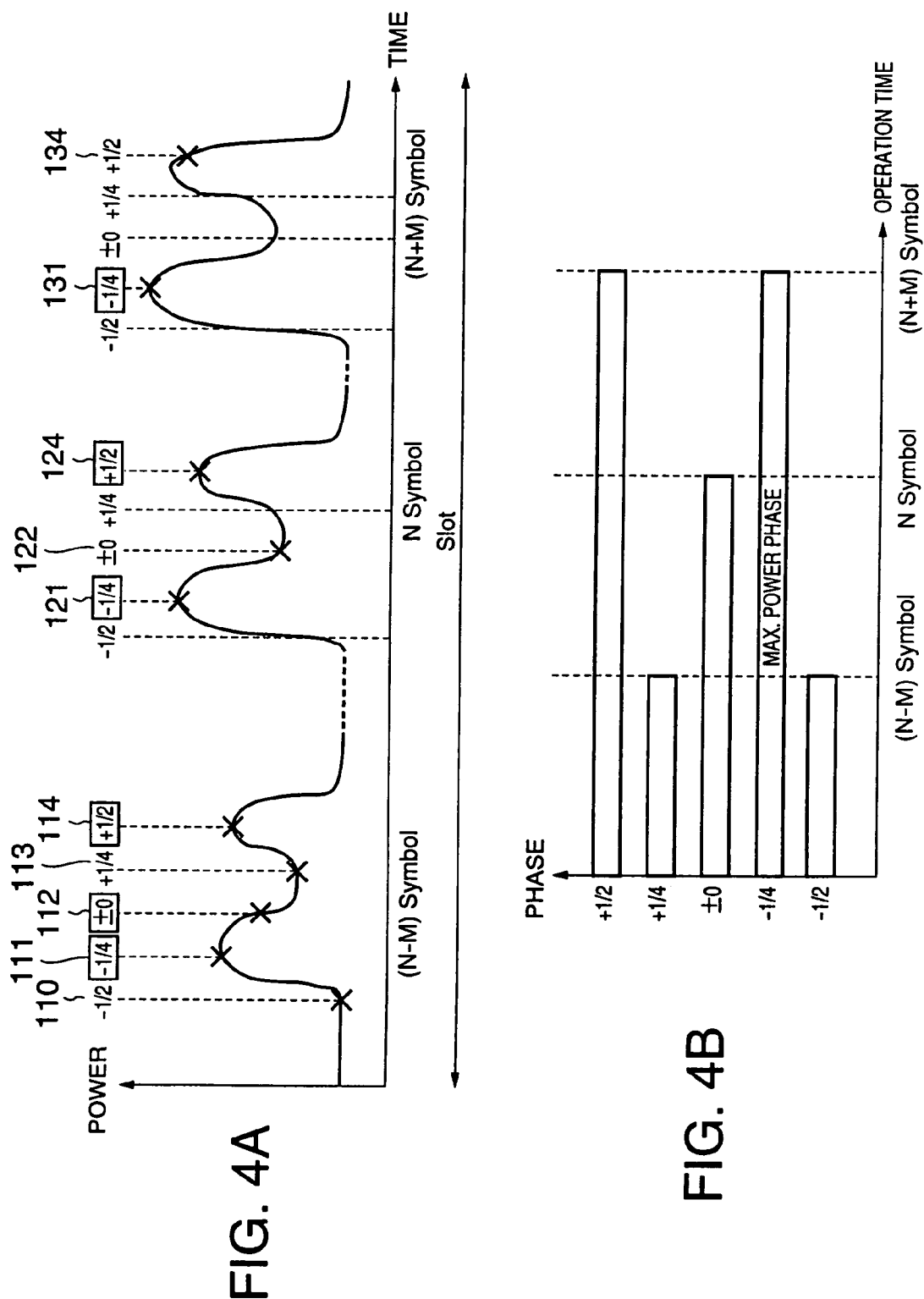
FIG. 4A is a diagram showing a wave form of power for explanation of a tracking control according to a second embodiment of the present invention.
FIG. 4B is a time chart showing an operation of the tracking control according to the second embodiment.

As shown in FIGS. 4A and 4B, symbols included in a desired time period within a slot are used to determine a tracking phase. More specifically, the controller 3 activates all the phases from an arbitrary symbol until (N−M) symbol and stores the calculated (here, averaged) power values 110-114 onto the respective registers 21-25, where N>M and N and M are integers greater than 1. For example, all the phases are activated from 1st symbol to 120th symbol. The maximum power detector 28 compares the power values and notifies the controller 3 of the maximum power value. The controller 3 determines the phase −¼ corresponding, to the maximum power value as the tracking phase and selects a predetermined number of smaller power values to stop corresponding phases operating. In this example, the controller 3 selects two smaller power values 110 and 118 and stops the complex multiplier 4, the correlator 16 and the power calculator 26 operating during time periods each corresponding to phases −½ and ¼. The controller 3 selects the other three power values 111, 112 and 114 and continues to activate them, during time periods each corresponding to phases −¼, 0 and +½. Accordingly, the complex multiplier 4, the correlator 16 and the power calculator 26 continue to operate only during time periods each corresponding to phases −¼, 0 and +½ until N symbol and the calculated power values 121, 122 and 124 are stored onto the power value registers 21, 23 and 24.

The maximum power detector 28 compares the power values 121, 122 and 124 and notifies the controller 3 of the maximum power value. The controller 3 determines the phase −¼ corresponding to the maximum power value as the tracking phase and selects a predetermined number of smaller power values to stop them operating. In this example, the controller 3 selects the power value 122 and stops corresponding phases operating. In this example, the controller 3 selects a smaller power value 122 and stops the complex multiplier 4, the correlator 16 and the power calculator 26 operating during the time period corresponding to phases 0. The controller 3 selects the other two power values 121 and 124 and the complex multiplier 4, the correlator 16 and the power calculator 26 continue to operate only during time periods each corresponding to phases ¼ and +½ until (N+M) symbol. The calculated power values are stored onto the registers 22 and 25.

As shown in FIG. 3B, the maximum power detector 28 compares the power values 131 and 134 and notifies the controller 3 of the maximum power value. The controller 3 determines the phase −¼ corresponding to the maximum power value as the tracking phase.

In this manner, the tracking control is performed by repeating the above control. In the present invention, the above operation breaks are not limited to (N−M) symbol, N symbol and (N+M) symbol An arbitrary symbol may be used as an operation break. Accordingly, a general expression may be (N−i) symbol, N symbol and (N+j) symbol.

Third Embodiment

In a tracking operation according to a third embodiment of the present invention, the tracking phase is determined for a slot by the controller 3 using predetermined thresholds while selectively activating the phases #1-#5.

As shown in FIG. 5A, it is assumed that the controller 3 has three predetermined thresholds TH1-TH3, where TH1<TH2<TH3.

As shown in FIGS. 5A and 5B, the controller 3 activates all phases #1-#5 from an arbitrary symbol until (N−M) symbol and stores the calculated power values 150-154 onto the registers 21-25, respectively. The maximum power detector 28 sequentially inputs the power values 150-154 through the selector 27 to compare them with the first threshold TH1 and outputs its comparison result to the controller 3. The controller 3 uses the comparison result to select a power value lower than the first threshold TH1 to stop a corresponding phase operating. In this example, the controller 3 selects one power value 150 and stops the complex multiplier 4, the correlator 16 and the power calculator 26 operating during a time period corresponding to the phase −½. The controller 3 selects the other power values 151-154 and continues to activate the other phases −¼, 0, +¼ and +½. Accordingly, the complex multiplier 4, the correlator 16 and the power calculator 26 operate until N symbol and the power values 161-165 are stored onto the registers 22-25.

The maximum power detector 28 sequentially inputs the power values 161-164 through the selector 27 to compare them with the second threshold TH" and outputs its comparison result to the controller 3. The controller 3 uses the comparison result to select a power value lower than the second threshold TH2 to stop it operating. In this example, the controller 3 selects the power values 162 and 163 lower than the second threshold TH2 and stops the phases 0 and +¼. The controller 3 selects the other power values 161 and 164 and continues to activate the phases −¼ and +½. Accordingly, the complex multiplier 4, the correlator 16 and the power calculator 26 operate until (N+M) symbol and the power values 171 and 174 are As shown in FIG. 5B, the maximum power detector 28 compares the power values 171 and 174 with the third threshold TH3 and, in this example, the controller 3 determines the phase −¼ corresponding to the maximum power value 171 as tie tracking phase.

In this manner, the tracking control is performed by repeating the above control. As described before, the above operation breaks are not limited to (N−M) symbol, N symbol and (N+M) symbol. An arbitrary symbol may be used as an operation break. Accordingly, a general expression may be (N−i) symbol, N symbol and (N+j) symbol.

In a tracking operation according to a fourth embodiment of the present invention, the tracking phase is determined for a slot depending on whether the maximum power value phase is changed during a predetermined number of symbols and, after the tracking phase has been determined the controller 3 stops all phases until a predetermined time period has elapsed, resulting in reduced power consumption.

As shown in FIGS. 6A and 6B, the controller 3 activates all phases #1-#5 from an arbitrary symbol until (N−M) symbol and stores the power values 200-204 in the registers 21-25, respectively. The maximum power detector 28 compares the power values 200-204 and outputs the maximum power value to the controller 3. In this example, the power value 203 at the phase +¼ is the maximum value.

When receiving the maximum power value, the controller 3 continues to activate all the phases #1-#5 until N symbol and stores the power values 210-214 onto the registers 21-25, respectively. The maximum power detector 28 compares the power values 210-214 and outputs the maximum power value to the controller 3. In this example, the phase +¼ provides the maximum value 213 again.

Since the power value at the phase +¼ is the maximum value consecutive times, the controller 3 determines that the phase +¼ is the tracking phase and then stops all the phases operating until the end of this slot.

In this manner, the tracking control is performed by repeating the above control.

Fifth Embodiment

In a tracking operation according to a fifth embodiment of the present invention, the tracking phase is determined by the maximum power detector 28 comparing power values obtained for a predetermined period of symbols to detect maximum power value. For other symbol periods, the controller 3 stops all phases performing the tracking control.

Figure 7A:
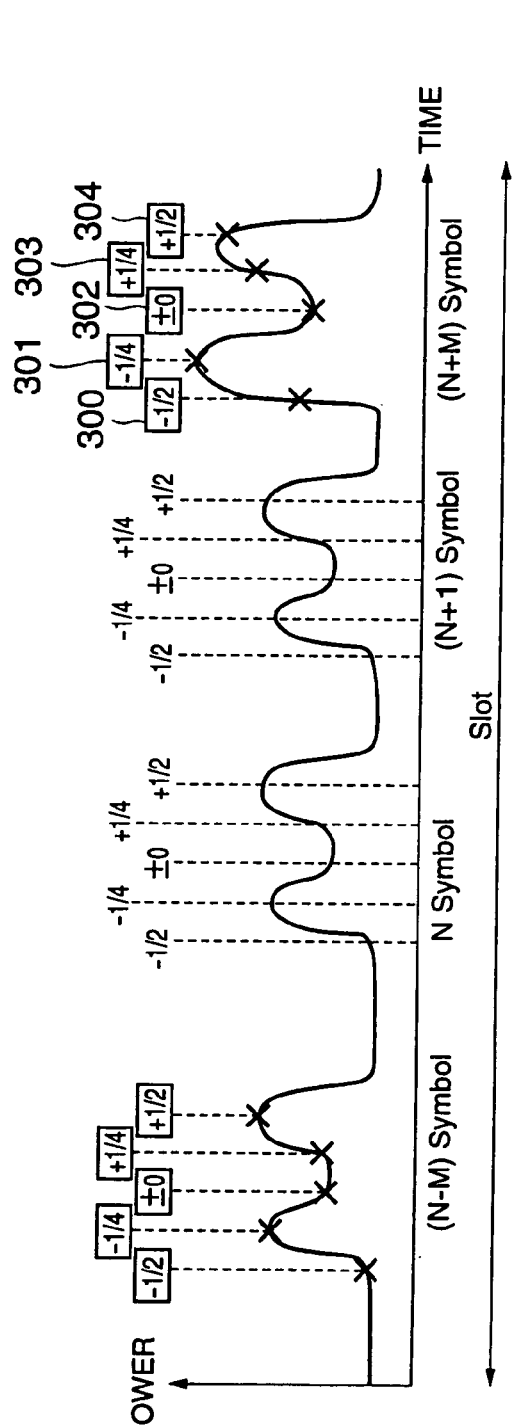
FIG. 7A is a diagram showing a wave form of power for explanation of a tracking, control according to a fifth embodiment of the present invention.
Figure 7B:
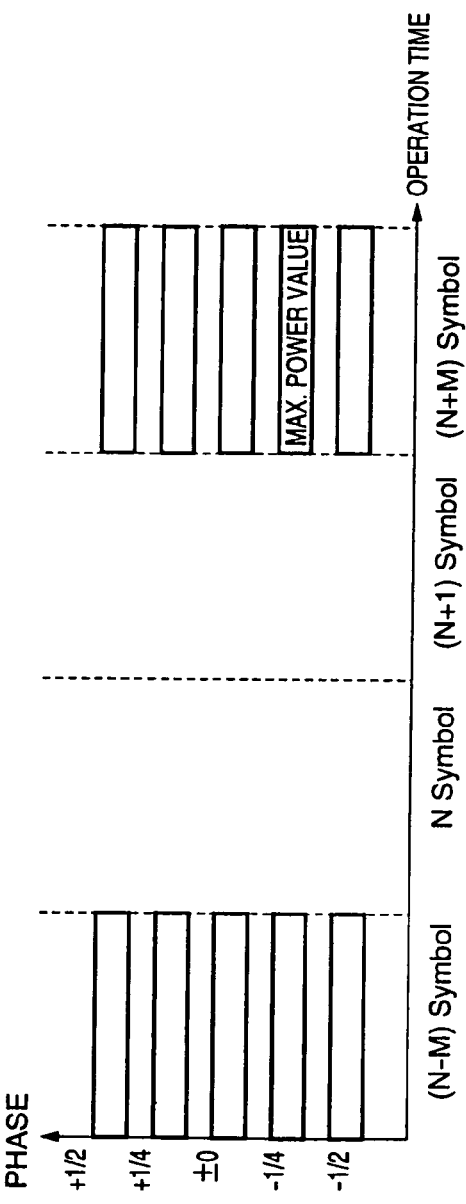
FIG. 7B is a time chart showing an operation of the tracking control according to the fifth embodiment.

As shown in FIGS. 7A and 7B, the controller 3 activates all phases #1-#5 in (N−M) symbol to store power values onto the registers 21-25 and then in (N+M) symbol also activates all the phases #1-#5 to store power values onto the registers 21-25. The controller 3 stops all the phases operating in other symbol periods.

The maximum power detector 28 compares the power values to determine the maximum power value during the activated symbol periods In this example, the power value 301 at the phase −¼ is the maximum value. Accordingly, the controller 3 determines that the phase −¼ is the tracking phase. In this manner, the tracking control is performed by repeating the above control.

As described before, the above operation breaks are not limited to (N−M) symbol, N symbol and (N+M) symbol. An arbitrary symbol may be used as an operation break. Accordingly, a general expression may be; (N−i) symbol, N symbol and (N+j) symbol.

Sixth Embodiment

A tracking operation according to a sixth embodiment of the present invention is performed in units of a slot by the controller 3 selectively activating the phases #1-#5 depending on a maximum power value history and a tracking phase.

In the present embodiment the controller 3 has a maximum power history storing, function of counting the number of times each phase has provided a maximum power value for a predetermined number of past power measurements. When the tracking phase has been determined to be a phase p (p=−½, −¼, 0, +¼, or +½), the controller 3 activates the phase p and other two phases providing larger history counts of maximum power and stops the remaining phases operating.

As shown in FIG. 5A it is assumed that the tracking phase is the phase −½ in (N−2) slot and the history counts of maximum power are 2 for phase −½, 1 for phase −¼, 1 for phase 0. 3 for phase +¼ and 3 for phase +½. Since the two phases providing the largest and second largest counts are +¼ and +½, the controller 3 activates three phases −½, ¼ and ½ in (N−1) slot to perform the tracking operation. More specifically, the controller 3 activates the complex multiplier 4, the correlator 16 and the power calculator 26 only during time periods each corresponding to the phases −½, +¼ and +½. Further, the controller 3 stops the complex multiplier 4, the correlator 16 and the power calculator 26 during time periods each corresponding to the other phases 0 and −¼. Accordingly, three power values 310, 313 and 314 are sequentially calculated by the power calculator 26 and are stored onto the registers 21, 24 and 25, respectively.

Figure 8A:
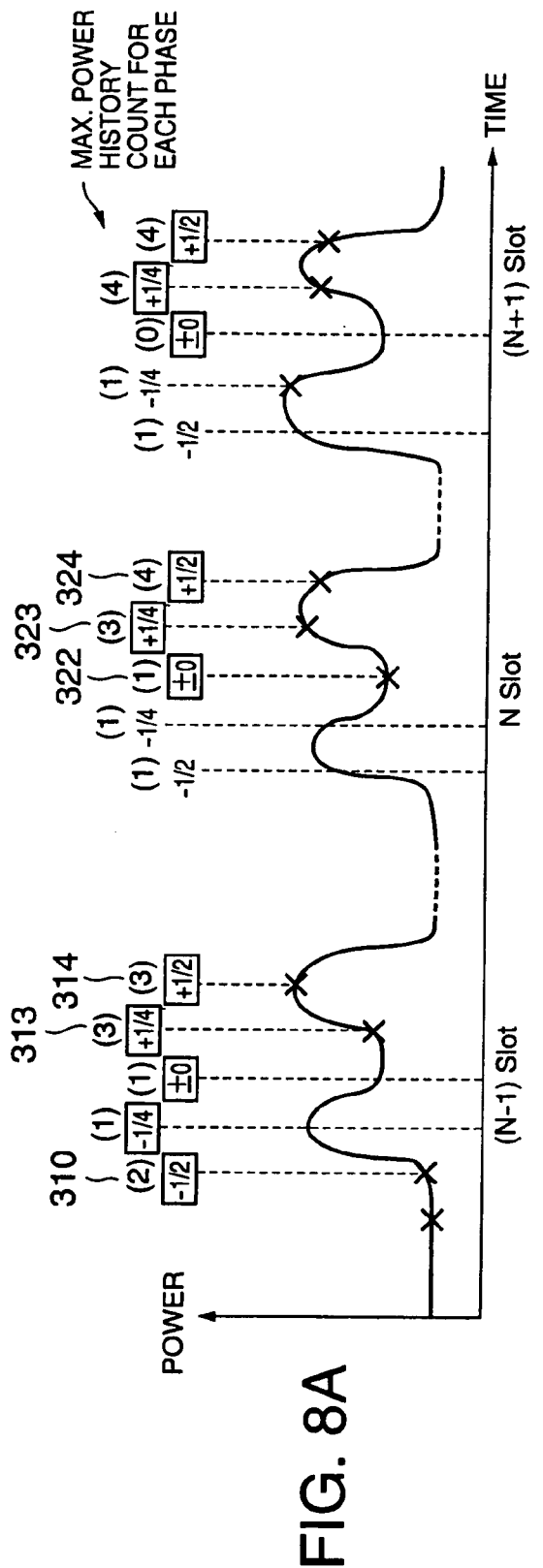
FIG. 8A is a diagram showing a wave form of power for explanation of a tracking control according to a sixth embodiment of the present invention.
Figure 8B:
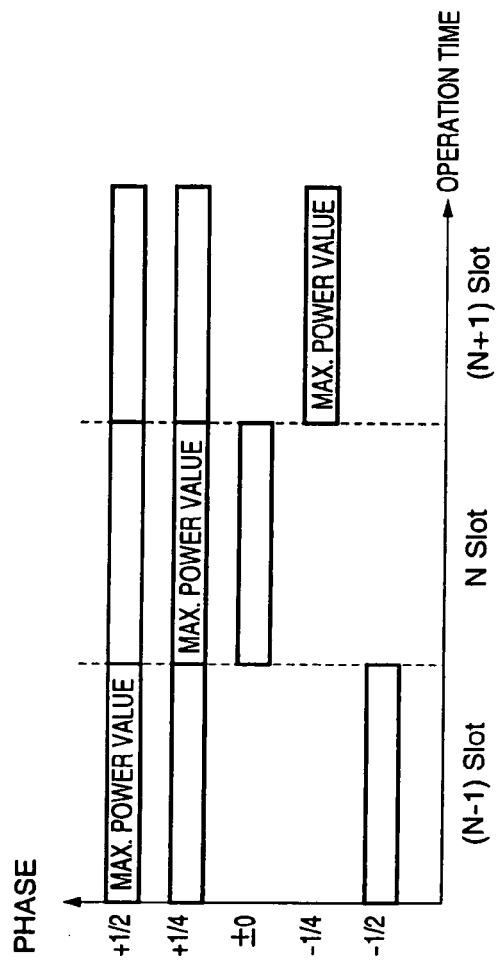
FIG. 8B is a time chart showing an operation of the tracking control according to the sixth embodiment.

As shown in FIG. 8B, the maximum power detector 28 compares the power values 310, 313 and 314 and, in this example, the controller 3 determines the phase +½ corresponding to the maximum power value 314 as the tracking phase. Since the phase +½ provides the maximum power value 314, the history count of maximum power for the phase +½ is incremented.

In N slot, the tracking phase is the phase +½ that has been determined in the previous slot and it is assumed that the history counts of maximum power are 1 for phase −½, 1 for phase −¼, 1 for phase 0, 3 for phase +¼ and 4 for phase +½. In the case where the history counts for phase −½ phase −¼, and phase 0 are the same the latest one is selected. Accordingly, the phase +¼ and phase 0 are determined as the two phases providing the largest and second largest history counts of maximum power other than the tracking phase +½. The controller 3 activates the phases 0, +¼ and +½ to perform the tracking operation. Accordingly, three power values 322, 323 and 324 are sequentially calculated by the power calculator 26 and are stored onto the registers 23, 24 and 25, respectively.

As shown in FIG. 8B, the maximum power detector 28 compares the power values 322. 323 and 324 and, in this example, the controller 3 determines the phase +¼ corresponding to the maximum power value 323 as the tracking phase. Since the phase +¼ provides the maximum power value 323 the history count of maximum power for the phase +¼ is incremented, Similarly, in (N+1) slot, the controller 3 activates the phases −¼, +¼ and +½ to perform the tracking operation. Accordingly, these power values are calculated and stored onto the registers 22, 24 and 25, respectively. As shown in FIG. 8B, the maximum power detector 28 compares the power values and, in this example, the controller 3 determines the phase −¼ as the tracking phase. Since the phase −¼ provides the maximum power value, the history count of maximum power for the phase −¼ is incremented.

In this manner, the tracking control is performed by repeating the above control in each slot.

The invention claimed is:

1. A tracking circuit in a CDMA receiver, comprising:
   a correlator for producing a correlation value between a reception signal and each of a plurality of phased spreading codes;
   a plurality of first memories each corresponding to different phases of the phased spreading codes, for storing correlation values;
   a first selector for selecting at least two of the first memories to sequentially read correlation values from selected first memories;
   a power calculator for calculating a power value from each of the correlation values sequentially read from the selected first memories;
   a plurality of second memories each corresponding to different phases of the phased spreading codes, for storing power values calculated by the power calculator,
   a second selector for selecting at least two of the second memories to sequentially read power values from selected second memories;
   a comparator for comparing the power values to produce a comparison result; and a controller for selecting at least two phases from the different phases based on the comparison result and controlling such that the correlator and the power calculator are activated during a time period corresponding to each of the selected phases.

2. The tracking circuit according to claim 1, wherein, when the comparison result indicates that a maximum power value among the power values is provided at a first phase, the controller selects the first phase and a plurality of second phases around the first phase to activate the correlator and the power calculator and stops activating them during a time period corresponding to each of the remaining phases.

3. The tracking circuit according to claim 1, wherein, when the comparison result indicates that a plurality of power values greater than others are each provided at a plurality of first phases, the controller selects the first phases to activate the correlator and the power calculator and stops activating them during a time period corresponding to each of the remaining phases.

4. The tracking circuit according to claim 1, wherein the comparator compares the power values with a predetermined threshold value,
wherein, when the comparison result indicates that a plurality of power values each corresponding to a plurality of first phases are greater than the predetermined threshold value, the controller selects the first phases to activate the correlator and the power calculator and stops activating them during a time period corresponding to each of the remaining phases.

5. The tracking circuit according to claim 1, wherein the controller selects all the phases to activate the correlator and the power calculator a predetermined number of consecutive times and, when the comparison result obtained at each activation indicates that a maximum power value is consecutively provided at a same phase, the controller stops activating the correlator and the power calculator, wherein the same phase is determined to be a tracking phase.

6. The tracking circuit according to claim 1, wherein the controller selects all the phases to activate the correlator and the power calculator a predetermined number of times at a predetermined interval, wherein when a maximum power value among power values obtained at activations is provided at a phase, the controller determines that the phase is a tracking phase.

7. The tracking circuit according to claim 1, wherein, when the comparison result indicates that a maximum power value among the power values is provided at a phase, the controller counts maximum power occurrences for each phase, wherein the controller selects a plurality of phases providing larger maximum power occurrence counts than others, to activate the correlator and the power calculator and stops activating them during a time period corresponding to each of the remaining phases.

8. The tracking circuit according to claim 7, wherein the maximum power occurrence count is a number of times a maximum power value has been provided at each phase out of a predetermined number of times.

9. A tracking method in a CDMA receiver including:
a calculator for calculating correlation-related data based on a reception signal and each of a plurality of phased spreading codes; and
a plurality of memories each corresponding to different phases of the phased spreading codes, wherein each of the memories stores correlation-related data of a corresponding one of the phased spreading codes,
the method comprising the steps of:
a) selecting at least two of the memories to sequentially read correlation-related data from selected memories;
b) comparing selected correlation-related data to produce a comparison result;
c) selecting at least two phases from the different phases based on the comparison result; and
d) activating the calculator to calculate correlation-related data during a time period corresponding to each of the selected phases.

10. A tracking method in a CDMA receiver including:
a correlator for producing a correlation value between a reception signal and each of a plurality of phased spreading codes;
a plurality of first memories each corresponding to different phases of the phased spreading codes, for storing correlation values;
a power calculator for calculating a power value from each of the correlation values sequentially read from the selected first memories; and
a plurality of second memories each corresponding to different phases of the phased spreading codes, for storing power values calculated by the power calculator,
the method comprising the steps of:
a) selecting at least two of the first memories to sequentially read correlation values from selected first memories;
b) storing a power value calculated from each of the correlation values sequentially read from the selected first memories;
c) selecting at least two of the second memories to sequentially read power values from selected second memories;
d) comparing the power values to produce a comparison result;
e) selecting at least two phases from the different phases based on the comparison result; and
f) activating the correlator and the power calculator during a time period corresponding to each of the selected phases.

11. The tracking method according to claim 10, wherein:
the step e) comprises the step of, when the comparison result indicates that a maximum power value among the power values is provided at a first phase in a slot, selecting the first phase and a plurality of second phases around the first phase; and
the step f) comprises the steps of:
f.1) activating the correlator and the power calculator during a time period corresponding to each of the first phase and the second phases;
f.2) stopping activating the correlator and the power calculator during a time period corresponding to each of the remaining phases; and
f.3) setting a tracking phase to the first phase for a subsequent slot.

12. The tracking method according to claim 10, wherein:
the step e) comprises the step of, when the comparison result indicates that a plurality of power values greater than others are each provided at a plurality of first phases, selecting the first phases; and
the step f) comprises the steps of:
f.1) activating the correlator and the power calculator during a time period corresponding to each of the first phases;

f.2) stopping activating the correlator and the power calculator during a time period corresponding to each of the remaining phases; and f.3) repeating the steps e), f.1) and f.2) for a predetermined number of symbols to determine a tracking phase proving a maximum power value.

13. The tracking method according to claim 10, wherein:

the step d) comprises the step of:

comparing the power values with a predetermined threshold value in a symbol, and the step e) comprises the step of, when the comparison result indicates that a plurality of power values each corresponding to a plurality of first phases are greater than the predetermined threshold value, selecting the first phases; and the step f) comprises the steps of:

f.1) activate the correlator and the power calculator during a time period corresponding to each of the first phases;

f.2) stopping activating the correlator and the power calculator during a time period corresponding to each of the remaining phases; and f.3) repeating the steps e), f.1) and f.2) in predetermined symbols while increasing the predetermined threshold value in symbols to determine a tracking phase proving a maximum power value.

14. A tracking method in a CDMA receiver including:

a correlator for producing a correlation value between a reception signal and each of a plurality of phased spreading codes;

a plurality of first memories each corresponding to different phases of the phased spreading codes, for storing correlation values;

a power calculator for calculating a power value from each of the correlation values sequentially read from the selected first memories; and a plurality of second memories each corresponding to different phases of the phased spreading codes, for storing power values calculated by the power calculator, the method comprising the steps of:

selecting all the phases to activate the correlator and the power calculator a predetermined number of consecutive times in a slot;

when the comparison result obtained at each activation indicates that a maximum power value is consecutively provided at a same phase, stopping activating the correlator and the power calculator in the slot; and setting a tracking phase to the same phase.

15. A tracking method in a CDMA receiver including:

a correlator for producing a correlation value between a reception signal and each of a plurality of phased spreading codes;

a plurality of first memories each corresponding to different phases of the phased spreading codes, for storing correlation values;

a power calculator for calculating a power value from each of the correlation values sequentially read from the selected first memories; and a plurality of second memories each corresponding to different phases of the phased spreading codes, for storing power values calculated by the power calculator, the method comprising the steps of:

selecting all the phases to activate the correlator and the power calculator a predetermined number of times at a predetermined interval; and when a maximum power value among comparison results obtained at activations is provided at a phase, setting a tracking phase to the phase.

16. A tracking method in a CDMA receiver including:

a correlator for producing a correlation value between a reception signal and each of a plurality of phased spreading codes;

a plurality of first memories each corresponding to different phases of the phased spreading codes, for storing correlation values;

a power calculator for calculating a power value from each of the correlation values sequentially read from the selected first memories; and a plurality of second memories each corresponding to different phases of the phased spreading codes, for storing power values calculated by the power calculator, the method comprising the steps of:

when the comparison result indicates that a maximum power value among the power values is provided at a phase, counting maximum power occurrences for each phase;

selecting a plurality of phases providing larger maximum power occurrence counts than others;

activating the correlator and the power calculator and stopping activating them during a time period corresponding to each of the remaining phases; and setting a tracking phase to a phase providing a maximum power value.

17. A tracking circuit in a CDMA receiver, comprising a correlator which produces a correlation value between a reception signal and each of a plurality of phased spreading codes;

a plurality of phase sections each corresponding to different phases of the plurality of phased spreading codes;

a power calculator which calculates a power value from each of the correlation values, said power value being stored in the corresponding phase section;

a comparator which receives power values from the phase sections and compares the power values to produce a comparison result; and a controller which receives the comparison result and which selectively activates the plurality of phase sections based on the comparison result.

* * * * *